United States Patent [19]
Nishino et al.

[11] 3,990,789
[45] Nov. 9, 1976

[54] PROJECTING SYSTEM FOR AUTOMATICALLY LOADING, THREADING PROJECTING AND REWINDING A PLURALITY OF FILMS IN CASETTES

[75] Inventors: Takaharu Nishino; Junsuke Tokumitsu; Masao Nozaki; Norimasa Arai; Yoichi Kashida, all of Yokohama, Japan

[73] Assignee: Victor Company of Japan, Limited, Japan

[22] Filed: Sept. 4, 1974

[21] Appl. No.: 503,161

[30] Foreign Application Priority Data
Sept. 6, 1973   Japan............................. 48-100652

[52] U.S. Cl. .............................. 352/123; 352/125; 352/157
[51] Int. Cl.² ........................................ G03B 21/04
[58] Field of Search ........... 352/123, 133, 157, 158, 352/159, 125

[56] References Cited
UNITED STATES PATENTS

| | | | |
|---|---|---|---|
| 3,342,541 | 9/1967 | Mouissie............................. | 352/123 |
| 3,540,803 | 11/1970 | Thevenaz............................ | 352/125 |
| 3,561,853 | 2/1971 | Thevenaz............................ | 352/125 |
| 3,722,988 | 3/1973 | Neudecker.......................... | 352/125 |

Primary Examiner—Monroe H. Hayes
Attorney, Agent, or Firm—Robert E. Burns; Emmanuel J. Lobato; Bruce L. Adams

[57] ABSTRACT

A series of film-containing cassettes are placed in projecting positions and thereafter in rewinding positions. First and second take-up reels are arranged to be axially movable between first and second positions. An elongate film guide member is movable between an active position in which the guide defines a straight threading path between the cassette occupying the projecting position and the take-up reel occupying the first position and a normally inactive position in which the guide is clear of the threading path. In the film threading mode, the leading end of film is driven through the straight threading path and taken up by the take-up reel. A film handling mechanism is provided between the opposite ends of the threading path. Upon completion of film threading, the movable elongate guide is restored to the inactive position and the film handling mechanism is brought into operation to engage the film with an aperture plate. Upon completion of film projection, the cassette and the first take-up reel which occupy the projecting and first positions, respectively, are shifted to the rewinding and second positions, respectively. A subsequent cassette is shifted to the projecting position and the second take-up reel occupies the first position. Film threading of the subsequent film cassette is effected simultaneously with rewinding of the previous cassette.

15 Claims, 17 Drawing Figures

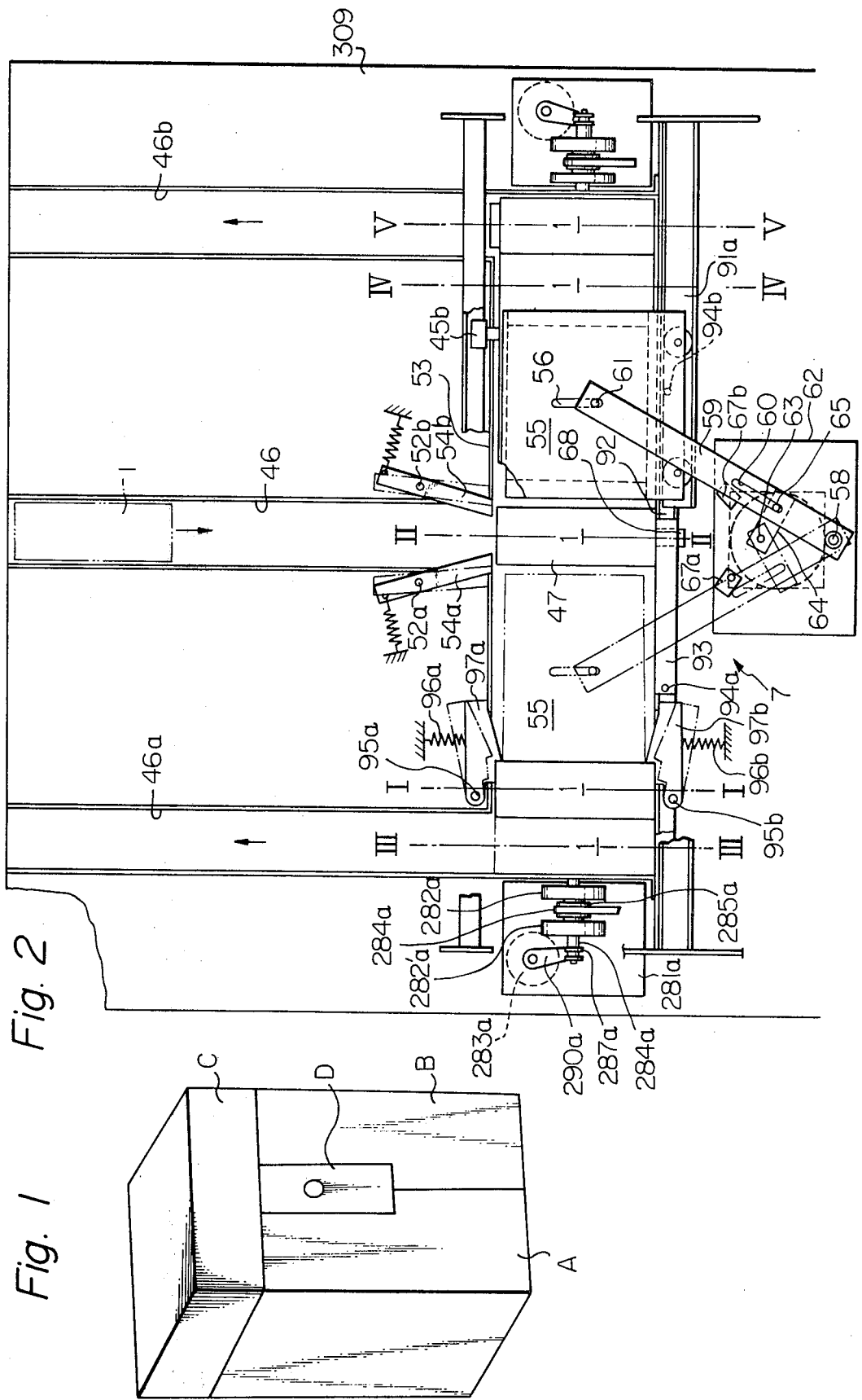

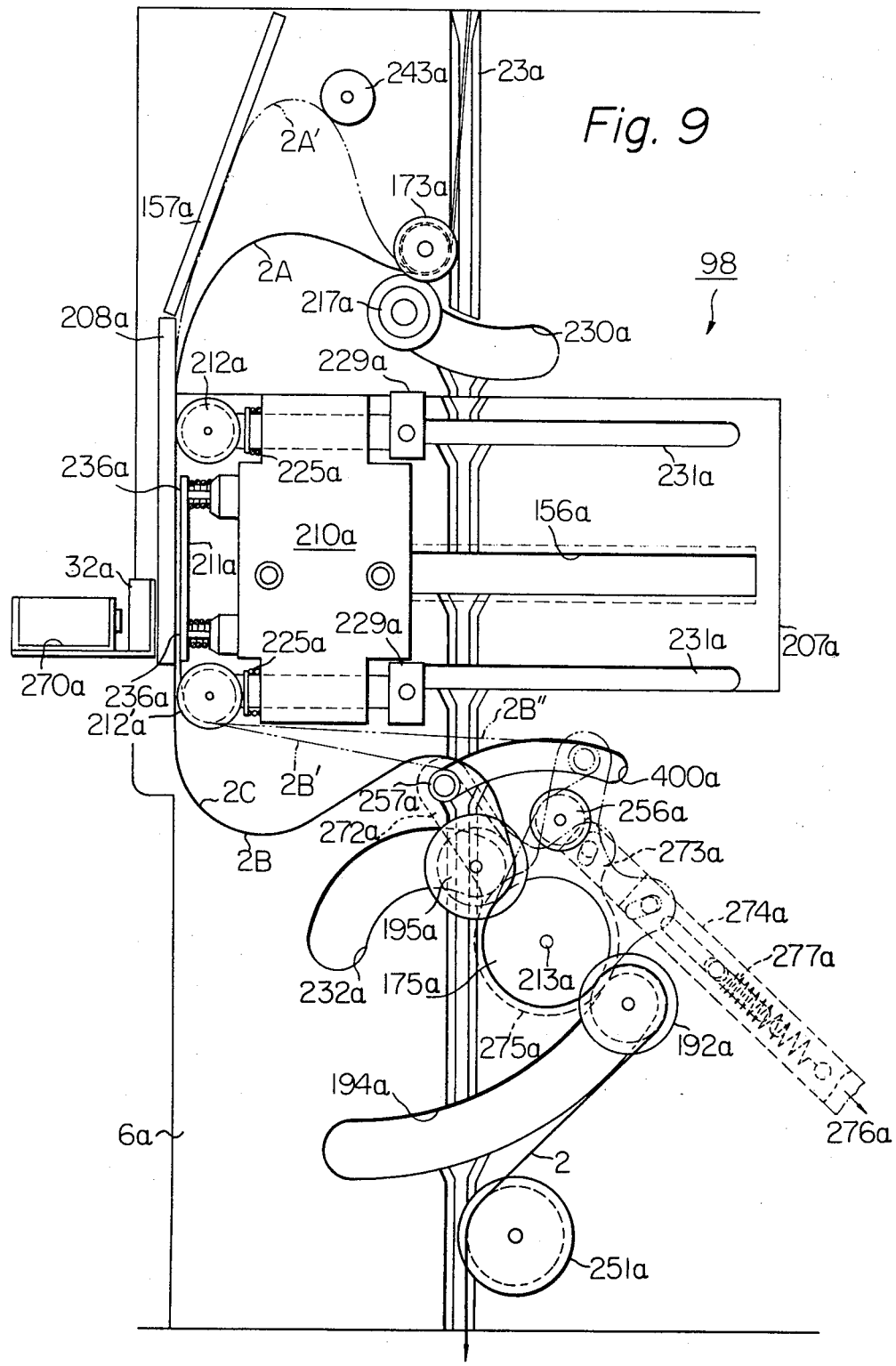

PROJECTING SYSTEM FOR AUTOMATICALLY LOADING, THREADING PROJECTING AND REWINDING A PLURALITY OF FILMS IN CASETTES

The present invention relates generally to motion picture projecting systems, particularly to motion picture projectors where cassettes containing motion picture film convoluted on a supply reel are used. More particularly, the invention relates to motion picture projectors wherein the images of frames on film contained in two or more successive cassettes can be projected in rapid sequence with minimal interruptions between the projecting of the last image on a preceding film and the first image on the nextfollowing film. Still more particularly, the invention relates to a motion picture projecting system preferred for use in television broadcasting stations where the images of commercial nature on film contained in cassettes are televised uninterruptedly or continuously in rapid sequence.

In television broadcasting stations, commercials are taken on short strips of motion picture film contained in cassettes and are televised in rapid sequence without interruption between the last image of a preceding film and the first image of the subsequent film.

Prior art motion picture projectors of the type used by television broadcasting stations are provided with automatic features such as automatic film threading and rewinding. However, the minimum film handling time (from the end of projection of a preceding film to the start of projection of the next-following film) is longer than the minimum projection period of a single strip of film. Additional projectors are required to operate in rapid sequence for uninterrupted film projection. Assume, for example, that the minimum projection period will be 5 seconds and the film handling time 30 seconds, six plus one additional projectors will be needed for uninterrupted service. The prior art projector thus results in an increase both in the investment and maintenance costs.

Although attempts have been made to record a sequence of commercial programs on a single strip of film in order to increase the minimum projection or running period compared with the film handling time, additional effort is required for editing the original strips of film and for re-editing or rearranging the programs for subsequent telecasting. Furthermore, this results in an increase in the amount of filmstrips because the same run of programs arranged in a given order of projection cannot repeatedly be used.

An object of the invention is to minimize the total number of motion picture projectors required for uninterrupted projection of comparatively short strips of film.

Another object of the invention is to eliminate the period of film handling operation from the end of projection of a preceding film to the start of projection of the next-following film.

A further object of the invention is to provide a motion picture projector which is designed to be used with cassettes for motion picture film, with novel and improved film loading, threading and collecting means which permit rapid threading of the leader of a filmstrip the images of which are to be projected onto a screen or the like and rapid rewinding of film into the respective cassette.

In accordance with one aspect of the invention there is provided a motion picture projector which comprises a housing supporting a film projection aperture and an intermittently movable shuttle tooth adjacent the aperture, means for supporting on or in the housing a series of supplies of wound motion picture film (each such supply is preferably stored in a discrete magazine of cassette), first shifting means for moving the supplies sideways in stepwise fashion so as to place successive supplies of film first into a projecting position and thereupon into a rewinding position, first and second take-up reels rotatably mounted on the housing on first and second axes and axially movable between first and second positions, second shifting means for opposedly moving the first and second take-up reels between the first and second position in coaction with the first shifting means so that the filmstrip supported between the take-up reel occupying the first position and the film supply in a cassette occupying the projecting position are shifted transversely to the direction of movement of film to the adjacent film-rewinding path established between the rewinding position and the second position, slotted guide means movable between an active of threading-path forming position in which the guide defines a straight, film-threading path extending between the film supply occupying the projecting position and the take-up reel occupying the first position and a normally inactive or retracted position in which the guide is clear of the threading path, and guide shifting means for moving the slotted guide means to the active position, and means for driving the supply to advance the leading end of the film through the threading path which permits rapid threading of film. The motion picture projectors of the invention is further provided with a film handling mechanism which comprises a sensor for sensing the presence of the leading end portion of the film passing through the threading path to produce a threading completion signal, first and second rollers spaced apart from each other and movable transversely to the threading path between an active position in which the first and second rollers are in frictional contact with the circumferential periphery of a first and a second capstan respectively and a normally inactive position disengaged from contact with the first and second capstans and cleared of the threading path, film guide and engagement means disposed between the first and second rollers and movable between an active position in which the film guide and engagement means urges the film into engagement with the intermittently movable shuttle tooth with a frame in said film being in registry with the film aperture and a normally inactive position in which the film is disengaged from the shuttle tooth, roller control and capstan drive means responsive to the threading completion signal for moving the first and second roller to the active position and for rotating the first and second capstans to feed the film to the take-up reel occupying the first position, third shifting means for moving the film with the roller control and capstan drive means, and rewinding means for rewinding the film from the take-up reel occupying the second position onto the supply occupying the rewinding position.

Upon completion of the film threading operation, the film handling mechanism is brought into operation to set the film in condition for projection. During the film projection, the filmstrip is moved frame by frame according to a contoured path established by the film handling mechanism. Completion of film projection is detected by sensing the presence of the trailing and of the film in order to restore the film handling mechanism to the normal inactive position. The trailing end portion of the film, being out of engagement with the shuttle tooth, is taken up by the take-up reel to remove the slack existing in the film disengaged from the film handling mechanism prior to subsequent film rewinding operation.

In accordance with another aspect of the invention, there is provided a motion picture projection system in which two projectors of the type described above cooperate with each other to provide uninterrupted film projection. The system further comprises loading means for alternately loading supplies of film to each of the projectors. During film projection of one projector, threading operation is carried out in the other in preparation for subsequent film projection. Upon completion of the film projection, an end-of-projection signal is produced to initiate film projection in the other projector so that there is no time lag between the last image of the preceding film and the first image of the next-following film.

These and other objects, advantages and features of the present invention will be clearly understood from the following detailed description taken in conjunction with the accompanying drawings, in which:

FIG. 1 is a schematic perspective view of a motion picture projecting system in accordance with the present invention;

FIG. 2 is a top plan view of a film loading mechanism of the invention;

FIG. 9 is an enlarged view of film handling mechanism in an active position with the film threaded through the various components of the film handling mechanism;

Figure 3:
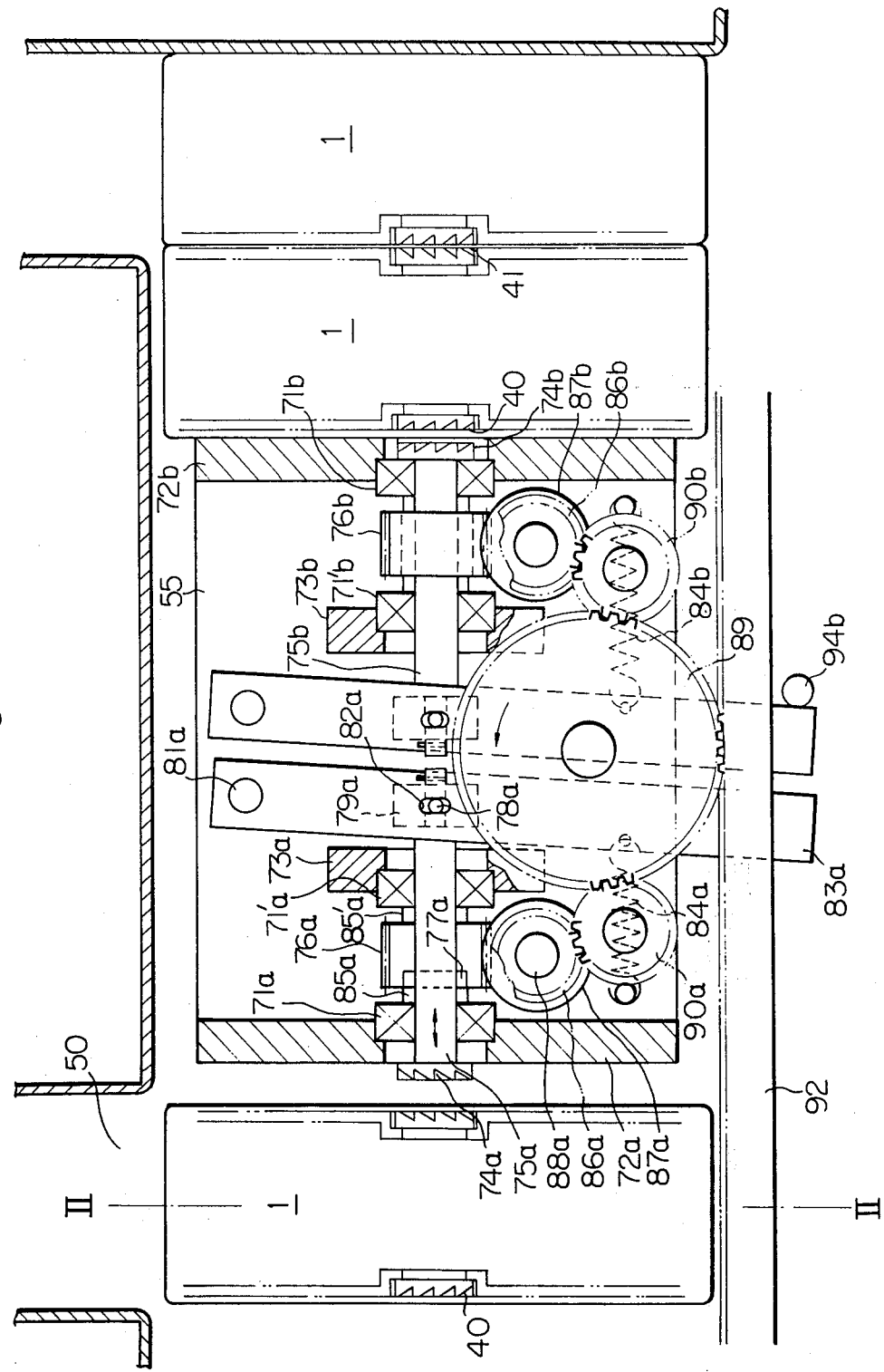
FIG. 3 is a detailed inside view in front elevation of the loading mechanism of FIG. 2.

Referring now to the drawings, a motion picture projecting system in accordance with the present invention is shown and generally comprises projectors A and B in parallel relationship, a film-containing cassette loader C which alternately supplies a series of cassettes to projectors A and B and an optical system D, as schematically illustrated in FIG. 1.

In FIG. 2 the cassette loader C comprises a sloped cassette inlet or supply passageway 46, cassette outlet or ejection passageways 46a of the projector A and 46b of the projector B, and a cassette shifter 7. The cassettes supplied through the passageway 46 are introduced into a standby passageway or chamber 47 (indicated by broken line II—II of FIG. 2). Two springbiased latches 54a and 54b are provided in the supply passageway 46 to prevent return movement of the cassette 1 from the chamber 47. The cassette seated in the chamber 47 is ready to be shifted along a cassette support or guideway 53 sideways. A sensor or switch 68 is provided on the wall of guideway 53 to sense the presence of a cassette in the standby chamber 47. A box-like cassette shifter or pusher 55 is disposed in the cassette support 53 and slidably movable along a guide rail 91a between two extreme positions by means of the angular movement of a shuttle arm 59, one end of which is pivoted as at 58 and the other end of which is coupled to the shifter 55 with a connecting pin 61 through an elongate slot 56. An arm 64 has its one end coupled to the shuttle arm 59 through a slot 60 and the other end connected to the circumferential periphery of a rotating shaft 63 of a two-way motor 62. Two sensors 67a and 67b are positioned on the motor 62 to cut off the current supplied to the motor 62 when in abutment with the shuttle arm 59 so that the shifter 55 is stopped at one of the extreme positions. Therefore, the cassette is pushed sideways by the shifter 55 and placed in a projecting position I—I of the projector A or a projecting position IV—IV of the projector B, whereupon the cassette is held in position by springbiased latches 97a and 97b (similar latches for holding the cassette in position IV—IV is not shown for simplicity).

In FIG. 3, the interior of the cassette shifter 55 is illustrated in detail. Cassette shifter 55 is provided with a spur gear 89 pivoted on a side wall thereof and meshing with a rack 92 and spur gears 90a and 90b. As the cassette shifter 55 moves along the guideway 53, the spur gear 89 is rotated and its rotation is transmitted via spur gears 90a, 86a and a helical gear 76a fixed to a shaft 75a which is rotatably and slidably mounted at one end on a bearing 71a and at the other end to an arm 83a. The counterclockwise rotation of gear 89 permits rotation of helical gear 76a about its axis while the shaft 75a is caused to move leftward so that toothed portion 74a provided at one end of the shaft 75a comes into engagement with a toothed shaft of the supply reel of cassette 1. The supply reel is thus rotated while it is moved by the cassette shifter 55 so that slackness, if any, in the wound film is picked up.

As the mating cassette is urged to engage the latches 97a and b, the lower end of arm 83a abuts a projection 94a (FIG. 2) and the arm 83a is caused to rotate at its pivot 81a overcoming the force of the spring 84a to thereby withdraw the shaft 75a to disengage the toothed claw 74a from the cassette 1. Likewise, the rightward meshing movement of the cassette shifter 55 will cause the pivot 81b to allow movement of arm 83b to abut a projection 94b as shown in FIG. 3 to disengage the same from the mating cassette. Therefore, the cassette in the projecting position II—II or IV—IV is placed in a suitable condition for subsequent film threading operation.

Figure 4:
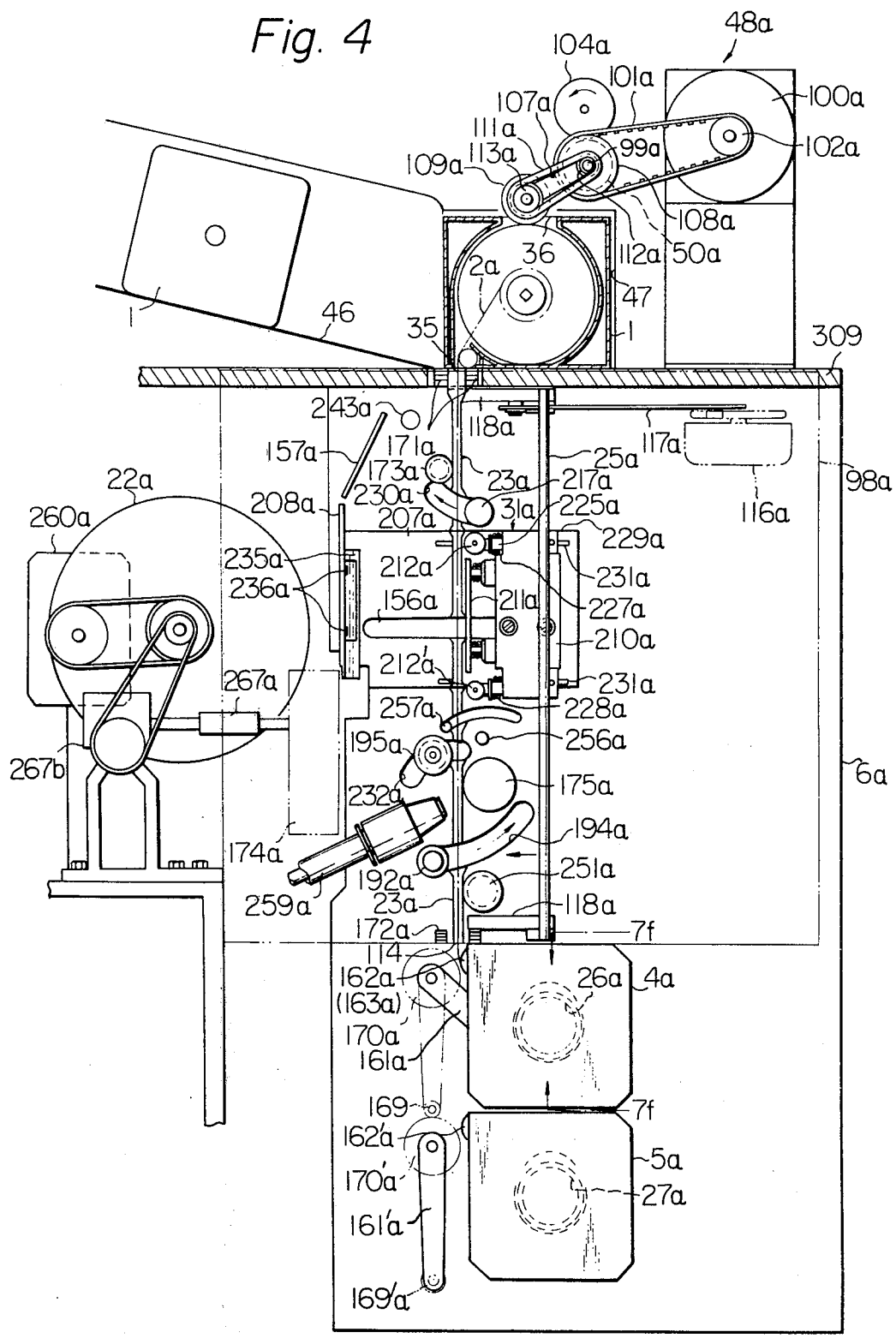
FIG. 4 is a side elevational view of the motion picture projecting system of FIG. 1 showing the film handling mechanism in normal position.
Figure 5:
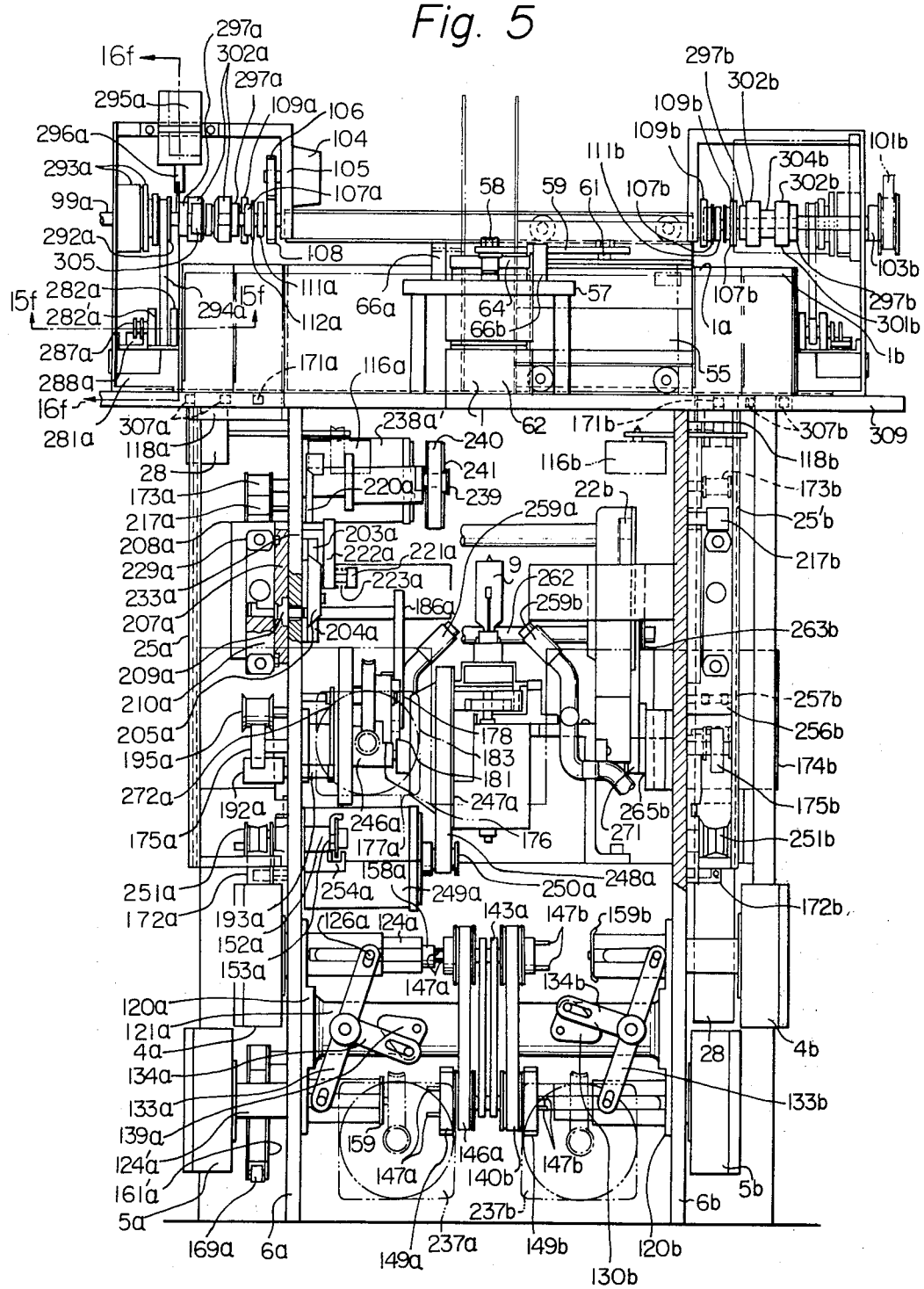
FIG. 5 is a front elevational view of the motion picture projecting system of FIG. 1.

In FIG. 4 the motion picture projector A which is similar in construction to projector B generally comprises a film drive mechanism 48a on a support plate 309, a film handling mechanism 98a supported on a side panel 6a and two take-up reels 4a and 5a supported on panel 6a. The film handling mechanism 98a includes a grooved guide member 25a which extends between the cassette opening 35 to the take-up reel 4a and is movable between an active position in which the guide member 25a defines a film threading path in coaction with a fixed guide groove 23a provided on the side plate 6a and a normally inactive position in which the guide member is retracted to be clear of the threading path as shown in broken lines. The grooved guide member 25a is pivoted at the opposite ends thereof to actuating arms 117a and 118a, the arm 117a being operatively coupled to a rotary solenoid 116a attached to the side plate 6a (see also FIG. 5).

The film drive mechanism 48a comprises a driving motor 100a having its shaft 102 operatively connected to a pulley 108a through a belt 101a. The pulley 108a is rotatable about a shaft 99a and fixed to a pulley 112a and an arm 107a is pivoted on the pivot shaft 99a at one end thereof with the other end being free to move vertically. A gear 50 in broken lines is pivoted on the shaft 99a and fixed to the arm 107a and in meshed engagement with a gear of the shaft of another rotary solenoid 104a. At the free end of the arm 107a there is provided a roller 109a which is driven by a belt 111a for unitary rotation with the pulleys 112a and 108a.

Cassettes 1 are supplied through the sloped guide loader 46 into chamber 47 in a manner as previously described. As a cassette is placed in the projecting position, the solenoid 116a is energized to move the grooved guide member 25a from the normally retracted position to the active position as described above so that the guide member 25a is in alignment with the fixed guide groove 23a provided on the side plate 6a.

It is to be noted that the motion picture projector of the present invention is intended to use cassette film having a leading tape attached to the leading end thereof. The leading tape has a width and a stiffness greater than those of the following film and is utilized in the present invention to particular advantage.

The threading path so defined has a width substantially equal to the width of the leading tape so that the film proper when threaded through the threading path is prevented from contact with the guide groove 23a and guide member 25a.

Upon the film path being formed, the motor 100a and rotary solenoid 104a are energized. By a predetermined rate of angular movement of solenoid 104a in a counterclockwise direction in FIG. 4, the free end of the arm 107a is lowered so that roller 109a comes into frictional engagement with the leading tape through the cassette opening 36. The rotation of motor shaft 102a causes the roller 109 a to drive the leading tape to be introduced into the threading path.

The leading tape which may be transparent or non-transparent is provided with a mark to be photoelectrically detected to initiate subsequent take-up operation. For this purpose, an upper detector 171a comprising a light source and a photoelectric device is positioned across the threading path at the upper end portion thereof and a lower detector 172a is positioned at the lower end of the threading path. When the mark is detected by the upper detector 171a, a take-up start signal is produced to initiate energization of a drive motor 237a (FIG. 5) to drive a take-up reel 4a positioned in alignment with the projecting position of the cassette.

Figure 6:
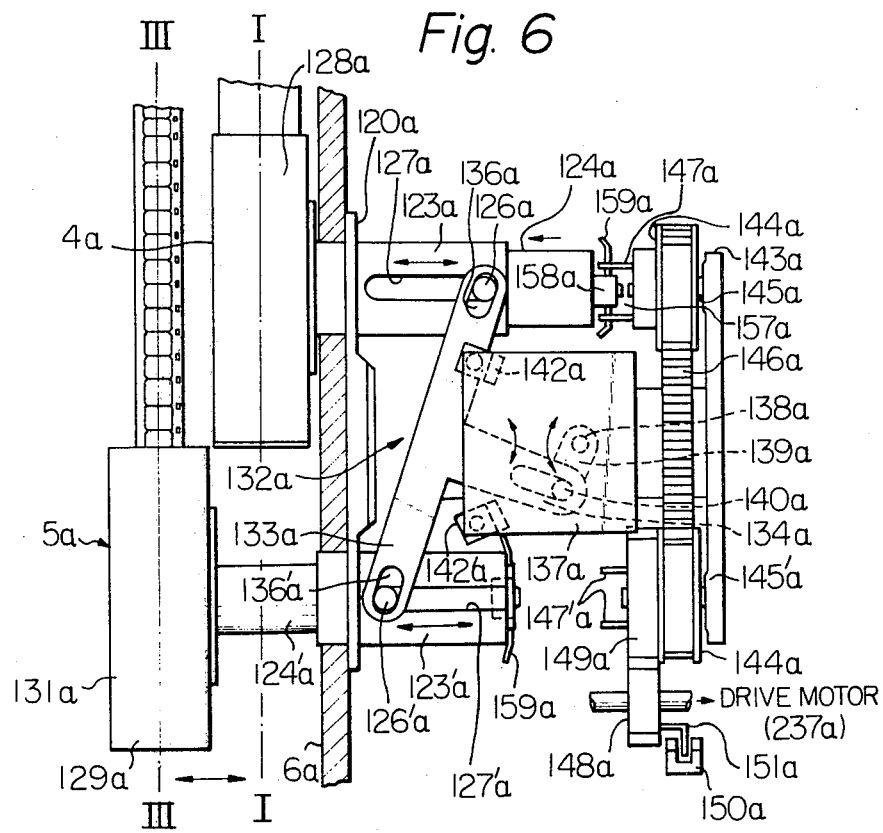
FIG. 6 is an enlarged front elevational view of the take-up reel shifting mechanism.
Figure 8:
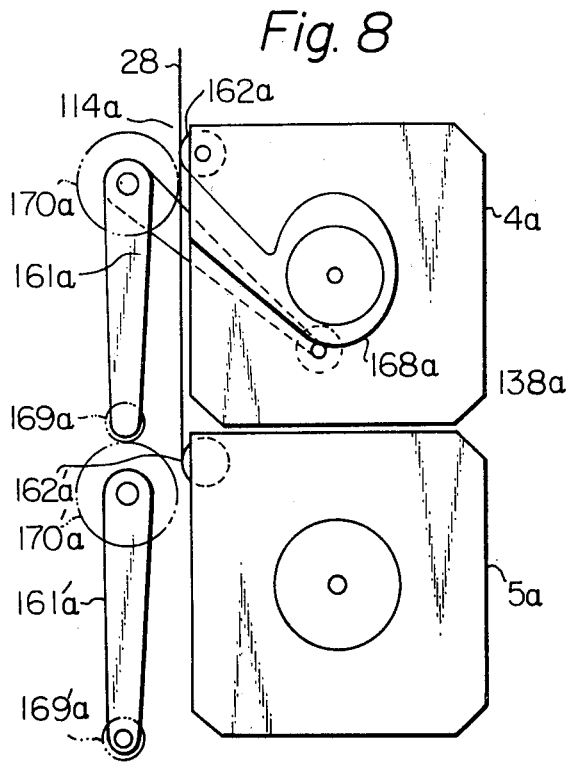
FIG. 8 is a side view of take-up reels showing an entry and angular slot.
Figure 7:
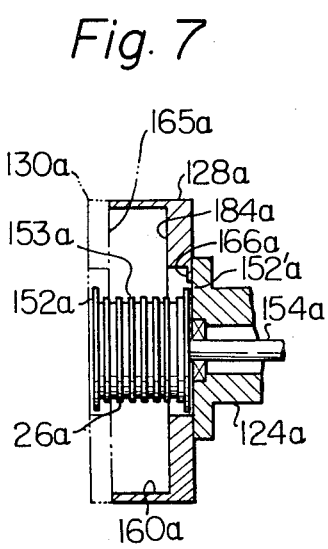
FIG. 7 is a cross-sectional view of a take-up reel and its housing taken along the line 7f—7f of FIG. 4.

Take-up reels 4a and 5a are supported on a support-and-drive mechanism (see FIG. 6) (no numeral) which in turn is supported on the side plate 6a and comprises a support member 120a and two cylindrical members 123a and 123'a carried on the support 120a and each having a side slot 127a and 127'a. Shafts 124a and 124'a are coaxially received in the cylindrical members and coupled to each other by means of a T-shaped link 132a by connecting pins 126a and 126'a through side slots 127a and 127'a and openings 136a and 136'a on the T-link. To effect axial movement of the shafts 124a and 124'a the openings 136a and 136'a are slightly elongate. At one end of each of the shafts the take-up reel housings 4a and 5a are fixed respectively. The T-link 132a has its leg operatively coupled to a shaft 138a of a two-way motor 137a through a linkage 139a. When the motor 137a is energized, the rotation thereof is converted by the linkage 132a into axial movement of shafts 124a and 124'a in opposite directions so that take-up reel housing 4a is placed in a first position (broken lines I—I) which is aligned with the cassette in its projecting position and the take-up reel housing 5a is placed in a second position (broken lines III—III) which is in alignment with the cassette in its rewind position. Numerals 142 are detectors or switches which when brought into contact with the linkage 132a serve to de-energize the motor 137a. Each of the shafts 124a and 124'a has a bore extending axially therethrough into which a drive shaft 154a is inserted (see FIG. 7). Each of the reel housings 4a and 5a has a take-up reel 26a fixed to one end of the drive shaft 154a and has on opposing side walls angular grooves 168a to provide an entry path for the forward end of the leading tape to ensure engagement with a resilient surface 153a of the take-up reel (FIG. 7).

Two drive wheels 144a are pivoted on a carrier 143a fixed to the support 120 and a belt 146a is supported therearound. Each of the drive wheels 144a has on its inner side a pair of projections 147a. Each drive shaft 158a has at the other end a clutch having two radially extending prongs 159a which will engage the projections 147a for unitary rotation therewith. Rotation of motor 237a upon the occurrence of take-up start signal is transmitted via spur gears 148a and 149a to the drive wheels 144a so that take-up reel 26a is rotated. A rotary solenoid 170a is provided adjacent the entry path of leading tape for take-up reels 4a and 5a. A guide arm 161a is rotatably fixed to the rotary shaft of the solenoid 170a which is energized simultaneously with energization of drive motor 237a to rotate the guide arm 161a into engagement with the circumferential periphery of the take-up reel hub 153a or resilient surface thereof.

The forward end of the leading tape advancing through the film path is guided by the arm 161a and is taken up by engagement between the guide arm 161a and the hub 153a. The speed at which the leading tape is supplied from the film cassette is lower than the speed at which it is taken up so that the leading tape becomes taut and the drive motor 237a is overloaded with a result that the speed of rotation of motor 237a is reduced. This reduction in speed is detected by a photoelectrical detector 150a which may be coupled to a frequency comparator which compares the signal derived from rotation of gear 148a with a reference frequency. Such a signal may be derived by interception of the light beam of the photodetector 150a by a prong 151a provided on the rim of gear 148a. When the rotation of gear 148a is reduced below a reference speed, the rotary solenoid 170a is de-energized to restore the guide arm 161a to its normal position.

When the mark on the leading tape intercepts the beam to detector 172a, an electromagnetic brake is applied to the motor 237a and the take-up reel is instantly caused to stop rotation. Upon detection of a lowering of frequency below the reference frequency, and the rotary solenoid 116a is de-energized to cause the slotted guide member 25a to return to the normal position, and the motor 100a is also de-energized to stop supply of film from cassette in the projecting position.

Figure 10:
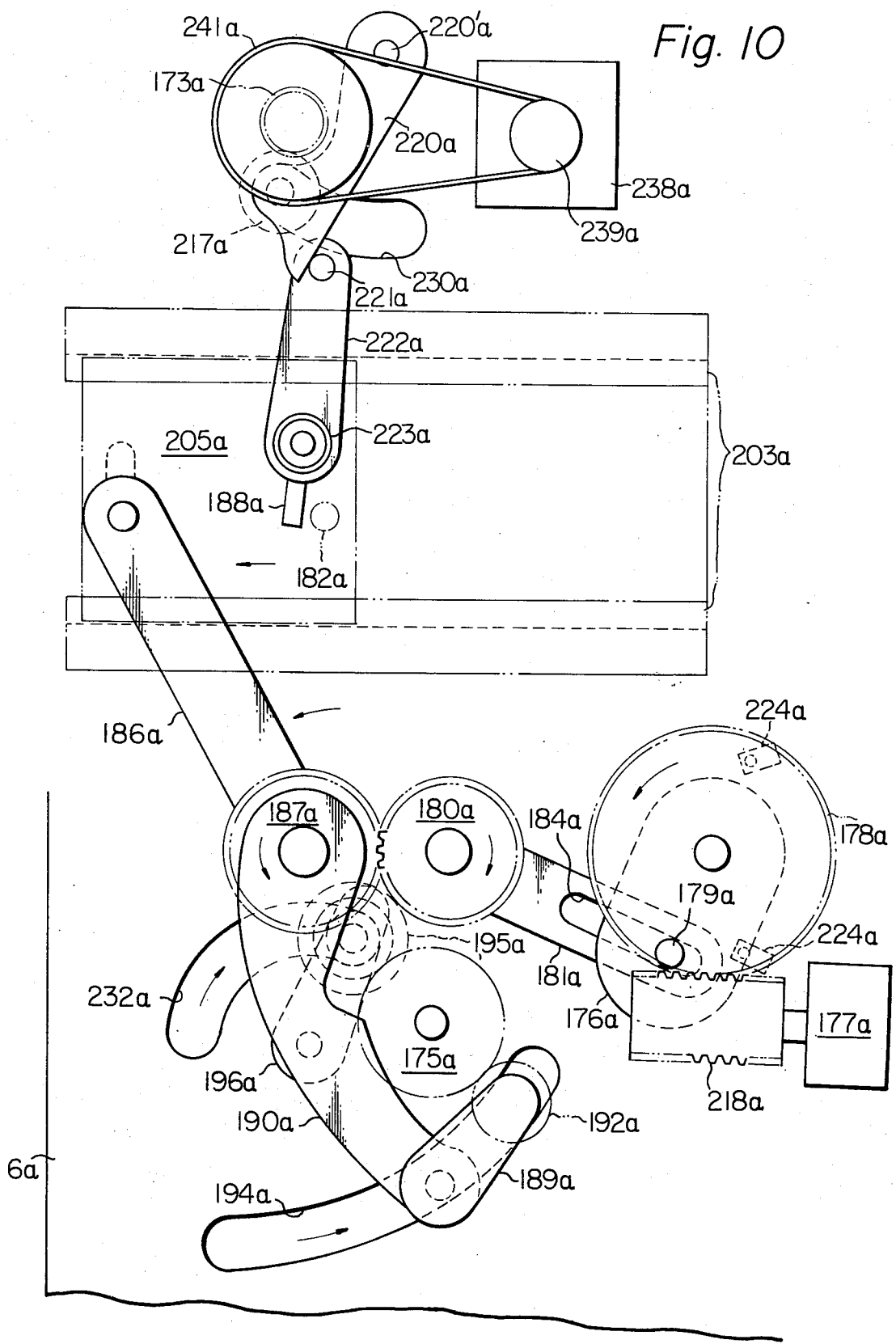
FIG. 10 is a view illustrating a driving mechanism of the film handling mechanism of FIG. 9.

In FIG. 4, the projection mechanism is shown to further include a film handling mechanism 98a which is also shown in FIGS. 9 and 10 and which generally comprises a support board 207a having a horizontal stepped guide slot 156a, an aperture plate 208a, side pressure shoes 236a on the aperture plate 208a and a guide plate 157a fixed to side panel 6a. A carriage 210a is slidable along the stepped guide slot 156a with a pressure shoe 211a and two guide rollers 212a and 212'a are resiliently supported thereby in order to urge the film into resilient abutment with the aperture plate 208a . The carriage 210a is movable between an active position in which the pressure shoe 211a is brought into abutment with the aperture plate 208a with film engaged therebetween and a normally inactive position in which the pressure shoe 211a is cleared of the film threading path 23a. For this purpose, two guide slots 231a are provided which restrict the movement of carriage 210a. The film handling mechanism further includes an upper capstan-and-roller arrangement comprising a capstan 173a and a roller 217a which is movable between an active position in which the roller 217a is in frictional engagement with the circumferential periphery of the capstan 173a with film therebetween and a normally inactive position disengaged from contact with the capstan 173a, and a lower capstan-and-roller arrangement comprising a capstan or sound drum 175a and rollers 192a and 195a which are movable between an active position in which the rollers 192a and 195a are in frictional engagement with the circumferential periphery of the sound drum 175a with film therebetween and a normally inactive position disengaged from contact with the sound drum 175a.

Upon completion of the threading operation, a reversible motor 177a (FIG. 10) is energized to drive a worm gear 218a which meshes with a worm wheel 178a, the counterclockwise rotation thereof (as indicated by the arrow) causing a spur gear 180a to rotate clockwise by means of connecting rods 176a and 181a coupled operatively to each other by a connecting pin 179a through an elongate slot 184a. Capstans 173a and 175a are also driven by suitable means upon completion of the threading operation. The angular movement of rod 176a is restricted by two switches or sensors 224a fixed to the side panel 6a which will de-energize the motor 177a upon the rod contacting with the sensors. A roller 195a is rotatably supported at one end of an arm 196a which is pivoted at the other end to the side panel 6a and normally urged by a spring (not shown) in a clockwise direction. The roller 195a is received in an arcuate guide slot 232a and is in abutment with the edge of an arcuate arm 190a. Upon rotation of the arm 190a in a counterclockwise rotation, the roller 195a is caused to move along the guide slot 232a into frictional engagement with the circumferential periphery of the sound drum 175a. A member 222a having an upper prong 221a is pivoted on the slide member 205a and normally urged in a counterclockwise direction by a spring 223a with a lower prong 188a being normally in contact with a stop 182a fixed to the slide member 205a. The roller 217a is pivotably supported on a pivoted member 220a and is slidably received in an arcuate guide slot 230a. Upon leftward movement of the slide member 205a, the upper prong or projection 221a is brought into abutment with the lower end of pivoted member 220a to urge it to rotate about its pivot 220'a so that the roller 217a is caused to move along the guide slot 230a into frictional engagement with the circumferential periphery of the capstan 173a.

With the above described elements being shifted to active positions in contact with the mating members, the film path is shifted to an active position in engagement between capstan 173a and roller 217a, between aperture plate 208a and pressure shoe 211a, and between rollers 195a, 192a and sound drum 175a (see FIG. 9).

It is to be noted that if the contoured film path between the sensor 172a and the aperture (not shown) on the aperture plate 208a is arranged to be equal to the distance between the mark position on the leading tape and the first frame of the film, the first frame will be brought into alignment with the aperture or projection axis upon completion of the film engagement operation.

Upon completion of the film engagement operation, the capstan 173a and sound drum 175a are instantly caused to stop rotation so that the first frame of film is placed in the right position ready for film projection which will subsequently occur. Under these circumstances, an upper free loop is formed in the film path between the point of engagement between roller 217a and capstan 173a and the upper roller 212a (as designated by 2A) and a lower free loop in the film path between the lower roller 212'a and the point of engagement between roller 195a and sound drum 175a (as designated by 2B).

Film projection is begun by a signal derived upon completion of film projection in the projector B so that film projection is effected alternately between projectors A and B without time lag between cassettes. During the film projection mode, the capstan 173a and sound drum 175a are driven as previously described to provide film advancement therethrough. An intermittent film drive mechanism 174a is provided which comprises a conventional shuttle tooth 32a which is normally in a retracted position by energization of an electromagnet 270a. The shuttle tooth 32a is cyclically movable to engage perforations in the film. The shuttle drive mechanism 174a is mounted to be moved by a universal joint 267a which is connected to a gear box 264a which functions to reduce the ratio of input drive rotation of motor 260a to the output rotation. A shutter 22a in the form of a disc is rotated by the motor 260a. The shuttle tooth 32a and the shutter 22a are operated synchronously by a motor 260a while capstan 173a and sound drum 175a are operated by motors 238a and 249a, respectively.

Figure 11:
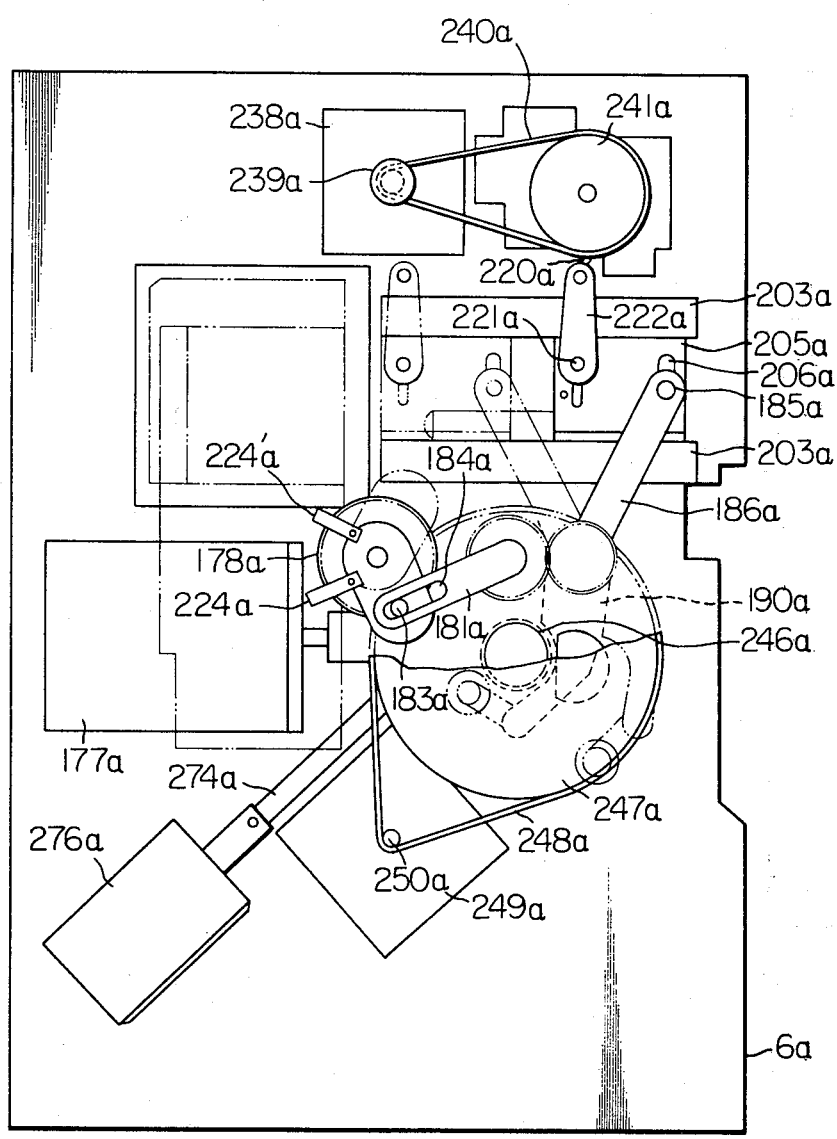
FIG. 11 is a rear side view of the film handling mechanism of FIG. 9.
Figure 12:
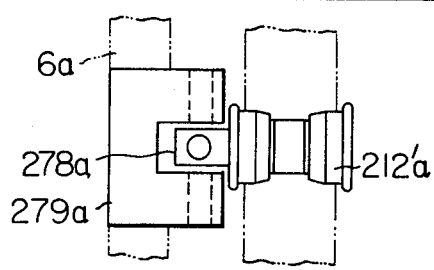
FIG. 12 is a view illustrating a lower loop condition sensor.
Figure 13:
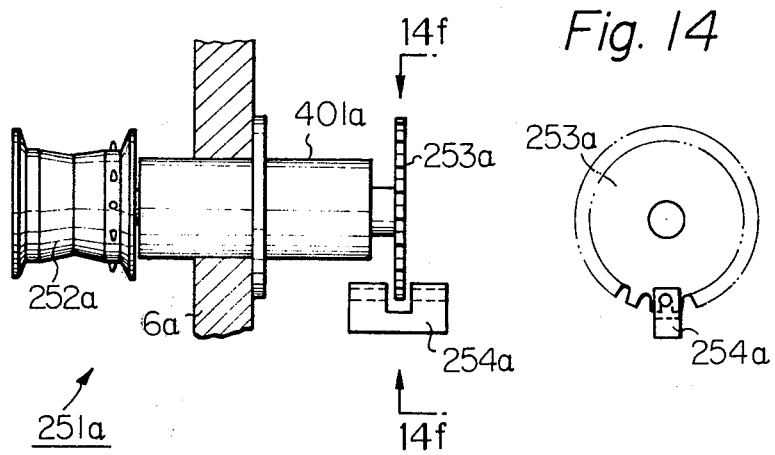
FIG. 13 is a view of a film feed speed sensor.
Figure 14:
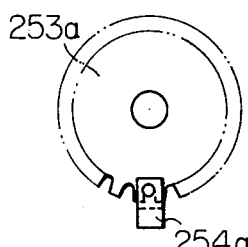
FIG. 14 is a cross section of the film feed speed sensor taken along the line 14f—14f of FIG. 13.

In the film projection mode, capstan 173a, sound drum 175a, shuttle drive mechanism 174a and take-up reel in the first position (take-up position I—I) are driven by the respective drive means. The peripheral speed of the capstan 173a is arranged to be slightly higher than the speed at which the film is driven by the shuttle tooth 32a so that the upper loop 2A enlarges with time and comes into contact with a sensor 243a mounted on the side panel 6a. The sensor 243a is constructed such that when in frictional contact with an enlarged loop 2A' (FIG. 9) a rotational sensing element is caused to rotate about its pivot to produce a signal. The signal is suitably converted into a brake pulse which will be applied to motor 238a in order to momentarily stop the rotation of capstan 173a. With this servo mechanism the film path fluctuates between loops 2A and 2A' at given intervals. If any mutilation exists in the film perforation, the upper loop will enlarge and the servo mechanism will be operated to restore the film loop size. In order to reproduce a sound signal, the sound drum 175a a driven at a constant peripheral speed. For this purpose, the sound drum is provided with a flywheel 247a (FIG. 11) which is driven by belt 248a supported between drive shaft 250a of the motor 249a and the fly wheel. During the initial period of rotation, the sound drum 175a is driven at a lower peripheral speed than the shuttle and therefore a smaller loop 2B' is formed between the sound drum and the lower guide roller 212'a. Subsequently, the sound drum 175a is driven at a constant speed and the film takes the form of a loop 2B during projection. If mutilation exists in the perforation in the film, the film will become taut as shown in phantom line 2B'. The taut film condition is detected by a sensor 279a provided on the side panel 6a which photoelectrically detects rotation of a shaft 278a with a transverse bore and coaxially fitted to the guide roller 212'a (see FIG. 12). An actuator plate 275a which comprises a long arm portion 272a and a short arm portion 273a is pivotally mounted to move about the shaft 213a mounted on the side panel 6a. The shorter arm portion 273a is operatively coupled to a connecting rod 274a which is connected to a solenoid 276a (FIG. 11). A guide roller 257a is pivoted to the extreme end of the longer arm portion 272a and is slidably received in a guide slot 400a. Upon detection of the taut film condition, the solenoid 276a is activated to retract the connecting rod 274a which is normally held in an extended position by a spring 277a so that the roller 257a is caused to move along the guide slot 400a. The roller 257a engages the film and pulls it out from engagement with the shuttle tooth 32a overcoming the force of spring 225a fitted between the guide roller 212'a and carriage 210a. The film loop 2B' is thus shifted to a position indicated by "2B" and projection is moved to the next frame. A sensor 256a is mounted on the side panel 6a to detect moving of the film to de-energize the solenoid 276a to restore the film to form the original loop 2B by means of spring 277a. With these arrangements, the film length between the shuttle tooth 32a and the sound drum 175a is maintained constant. Since the peripheral speed of sound drum 175a affects the faithful reproduction of the sound signal, a servo mechanism is provided for the sound drum. A sprocket wheel 251a is rotatably mounted on the panel 6a and coaxially coupled to a toothed wheel 253a having a plurality of teeth on the rim thereof. A speed sensing photoelectrical element 254a which comprises a light beam source and a light-sensitive element in opposed relation is positioned adjacent the toothed portion of the wheel 253a (see FIGS. 13 and 14). The rotation of wheel 253a by engagement with the moving film 2 interrupts the light beam at short intervals in the sensing element 254a which produces a train of electrical pulses, the interval of pulses being proportional to the speed of rotation. The repetition frequency of the pulses is compared with a reference frequency. The resultant signal is fed into the drive motor 177a which drives the sound drum 175a in a manner that controls the speed of rotation thereof.

When the film projection operation is over, an end of projection signal is produced by a suitable means such as by detecting a mark provided on the trailing end of the film. Upon the occurrence of the end of projection signal, motors 238a and 249a are de-energized to cease rotation of capstan 173a and sound drum 175a, respectively, and in addition, electromagnet 270a is de-energized to disengage the shuttle tooth 32 from perforations in the film. The voltage applied to the drive motor 237a of the take-up reel 4a is reduced to a level no longer capable of taking up the engaged film but only capable of taking up a length of disengaged film in the contoured film path in the film handling mechanism as will be described below. Simultaneously with this, motor 177a which causes the film handling mechanism to move between the film engagement and disengagement positions is operated in reverse direction. The rollers 217a, 195a and 192a are disengaged from contact with the mating capstans 173a and 175a, and carriage 210a returns to the original position. The film thus disengaged from the film handling mechanism is taken up by the reel 4a to provide tensioning of the film ready for being shifted to the rewinding position as will be described later.

Referring now to FIG. 2, upon completion of the loading of cassette 1 into the projecting position I-I of projector A in a manner as previously described, the next cassette is introduced into chamber 47 through guide slot 46 and moved rightward by the shifter 55 upon return movement of the arm 59 until the cassette is introduced into projecting position IV—IV of projector B, and the next-following cassette is introduced into chamber 47.

During the period when the various components of film handling mechanism 98 are returned to the original positions, the cassette shifting motor 62 is again energized to rotate arm 59 counterclockwise to urge the next-following cassette now in the chamber 47 to move leftward into abutment with the side of cassette which occupies the projecting position with respect of which film projection operation has just been completed. Upon the arm 59 coming into contact with the sensor 67a, the above-mentioned cassette in the projecting position is pushed by the next-following cassette and dislocated from the projecting position and enters rewind position III—III, and the next-following cassette is placed in the projecting position.

Simultaneously with the shifting of cassettes in the loader C, reversible motor 137a is energized to rotate the T-link 132a counterclockwise so that the take-up reel housing 4a together with the take-up reel therein is shifted to the rewind position III—III and take-up reel housing 5a is shifted in an opposite direction to the take-up position I—I which is in alignment with the cassette in the projecting position I—I.

Figure 15:
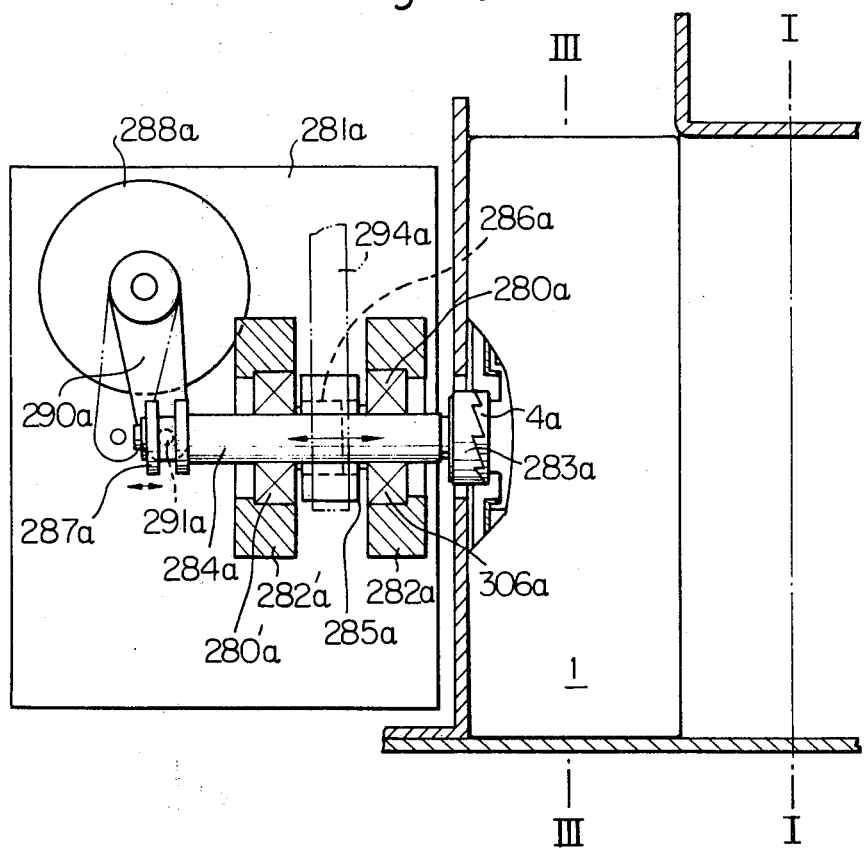
FIG. 15 is a cross section of a film rewinding mechanism taken along the line 15f—15f of FIG. 5.

With the cassette and take-up reel housing 4a both in the rewind position with the trailing end portion of film extending therebetween straight, a film rewind mechanism 281a is operated (see FIG. 15). The rewind mechanism 281a comprises two bearing supports 282a and 282'a, bearings 280a and 280'a respectively received therein, and a shaft 284a slidably and rotatably supported by bearings 280a and 280'a. The shaft 284a is provided at one end with teeth 283a and is operatively coupled to a spring-biased arm 290a of a rotary solenoid 288a by a connecting pin 291a. The shaft 284a is provided with a pin 286a fixed transversely thereto and a pulley 285a having two axial grooves therein is axially slidably fixed to the shaft 284a with the pin 286a being received in the axial grooves. A belt 294a is supported between the pulley 285a and a pulley 292a (FIG. 5) which is fixed to a drive shaft 99a through an electromagnetic clutch 293a. Rotation of shaft 99a by a suitable means is transmitted through clutch 293a and belt 294a to the shaft 284a of the rewind mechanism. Upon shifting of the cassette and take-up reel to the rewind positions, the rotary solenoid 288a is energized to rotate its arm 290a so that the toothed portion 283a is brought into meshing engagement with the toothed portion of the reel in the cassette 1 in the rewind position III—III. The film in the cassette 1 is thus rewound in the cassette housing.

A photoelectrical sensor 307a (FIG. 5) is mounted on the support plate 309 adjacent to the film path. As the mark on the leading tape traverses the sensor 307a, an end-of-rewind signal is produced whereupon the electromagnetic clutch 293a and the rotary solenoid 288a are de-energized.

Figure 16:
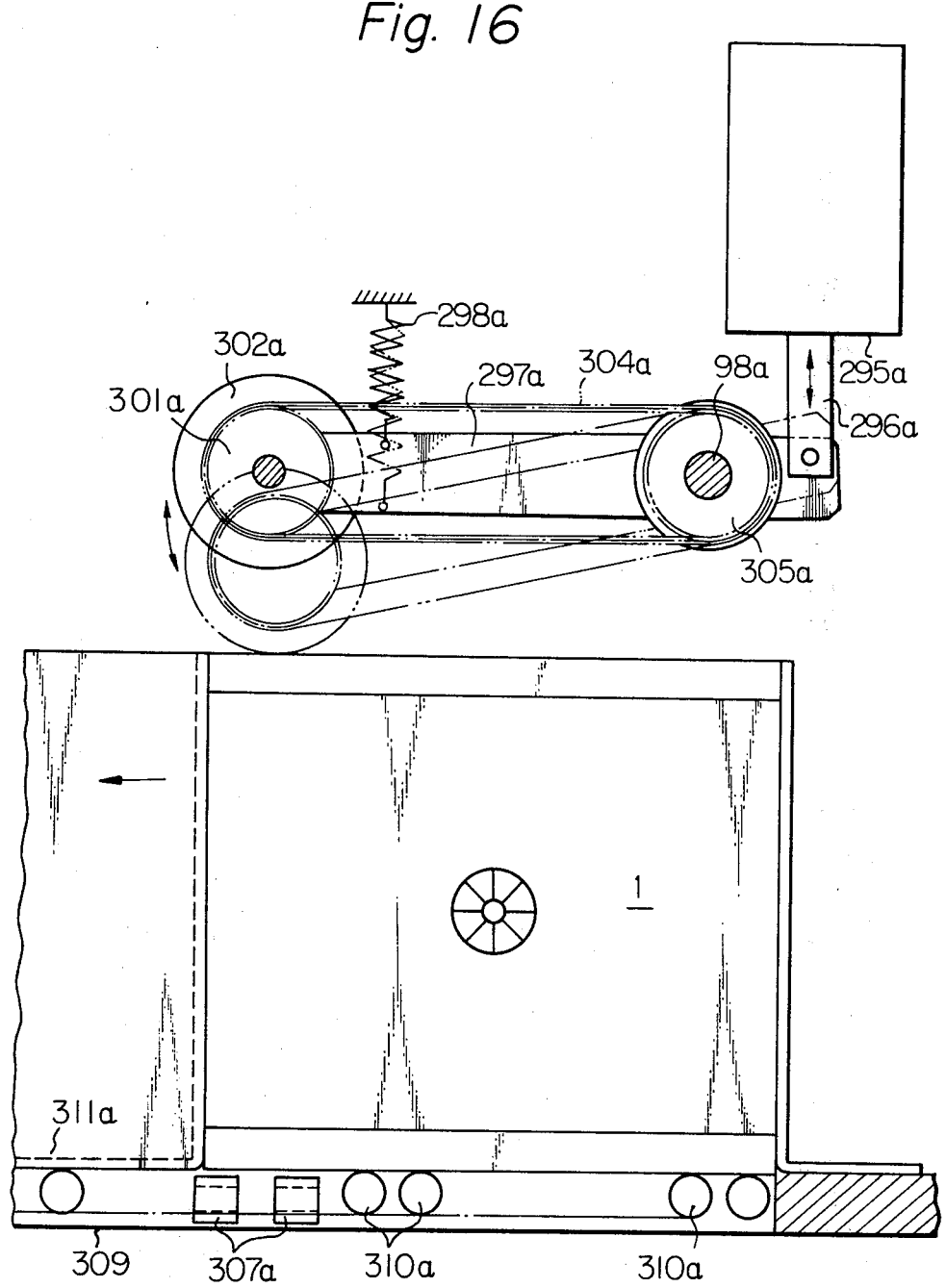
FIG. 16 is a cross sectional view of a film ejection mechanism taken along the line 16f—16f of FIG. 5.

The present invention further contemplates the use of an automatic cassette ejection mechanism which comprises a roller control and drive means (see FIG. 16). A roller 302a with a pulley 301a fixed thereto is pivotally mounted at one end of an arm 297a which is pivoted at a point intermediate the opposite ends to the shaft 99a. A pulley 305a is fixed to the shaft 99a for unitary rotation therewith. The arm 297a is at the other end connected to a plunger 296a of a solenoid 295a and normally urged away from the top wall of cassette 1 as illustrated in FIG. 16. The end-of-rewind signal is then utilized to operate the solenoid 295a so that roller 302a is brought into frictional contact with the top wall of the cassette to be ejected. The electromagnetic clutch 293a is also activated to transmit rotation to the roller 302a shaft. The cassette 1 is thus caused to slide over a plurality of rollers 310a and ejected to the exit path 311a. Simultaneously with the rewinding operation, the next cassette is placed in the projecting position I—I and threading thereof will be initiated in preparation for subsequent film projection which starts at the end of projection of the film in the projecting position IV—IV of projector B. For uninterrupted film projection operation from one cassette to another, the end of projection signal referred to above is utilized to initiate projection in the projector B in which film threading and engagement operations have been completed within a preceding projection operation.

Figure 17:
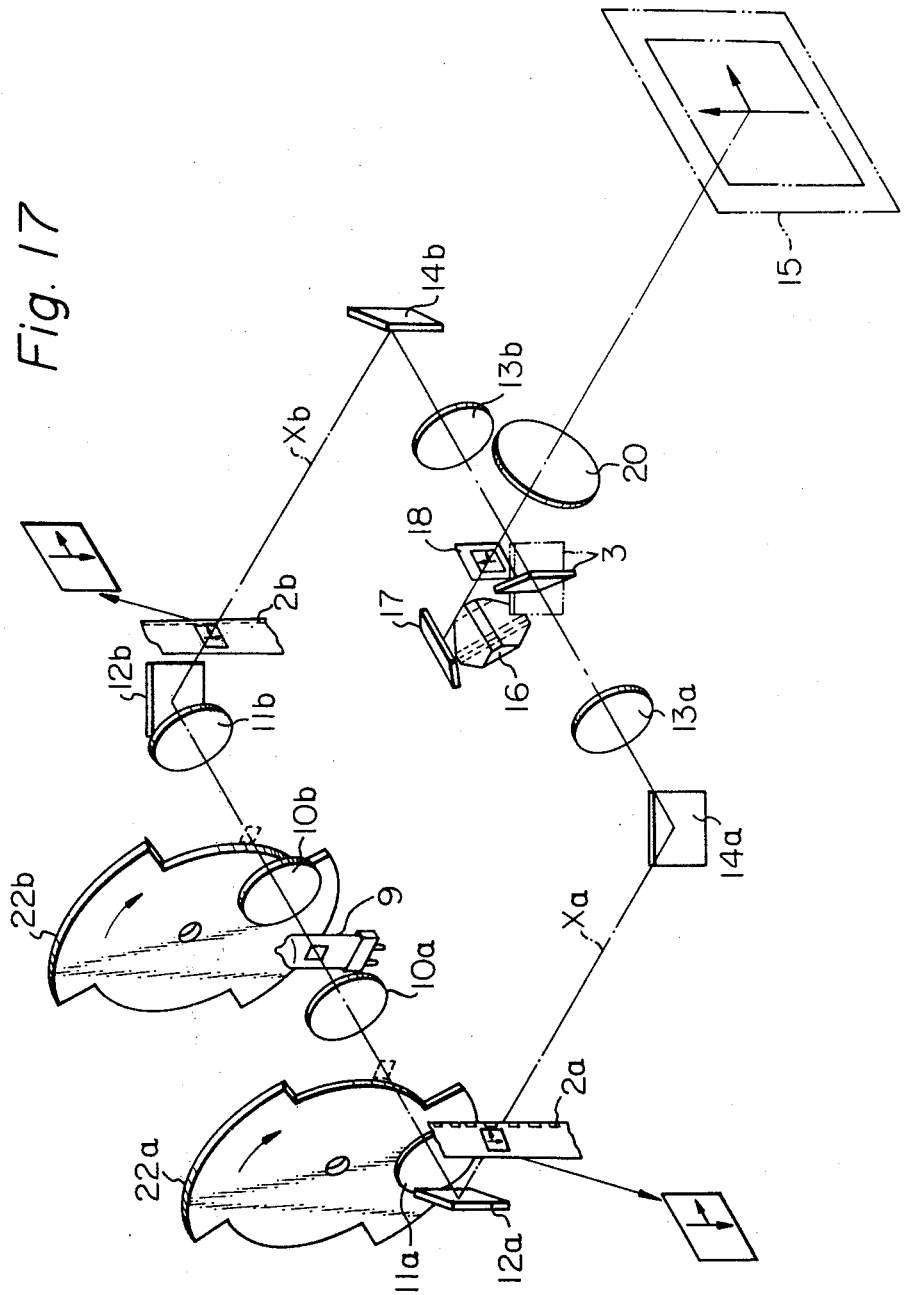
FIG. 17 is a schematic illustration of an optical system used in projectors of the invention.

Although separate optical systems may be employed for film projection, the present invention contemplates the use of a common projection lens and a screen to achieve economy and ease of operation. In FIG. 17, the optical system comprises generally a common light source 9 and a shutter 22a disposed between two condenser lenses 10a and 11a. The light source 9 emits beams of light in two opposite directions: one for projector A passes through lenses 10a, shutter 22a and condenser lens 11a and is reflected by a reflector 12a at a right angle and passes through film 2a in a projection axis "Xa" of projector A and is again reflected by a reflector 14a at a right angle to a lens 13a. A reflector 3 is mounted on a pivot to be rotated 90° between two extreme positions to reflect the beams at right angles to a common prism 16 which inverts the image with respect to the vertical projection axis. The optical system further comprises two condenser lenses 10b and 11b with a shutter 22b interposed therebetween. The other light beam for projector B passes in a similar manner through condenser lens 10b, shutter 22b, lens 11b and is reflected by a reflector 12b at right angles through film 2b in projection axis "Xb" of projector B. The reflector 3 is actuated by suitable means upon occurrence of an end-of-projection signal to reflect the light beam from reflector 14b through lens 13b. The film picture is also inverted with respect to its vertical projection axis so that the inverted image on the light path through the optical system is corrected and focussed through a reflector 17 and a common projection lens 20 onto a screen 15.

An important advantage of the improved motion picture projector is that it comprises an elongate grooved guide member which is movable between a filmpath forming position and a normally retracted position. The guide member defines a straight treading path between the supply and the take-up reels so that the leading end of film is allowed to pass therethrough at a high speed.

Another important advantage of the improved motion picture projector is the provision of the mark sensor 172a which detects the completion of film threading in a position between the take-up occupying the take-up position and the sound drum 175a. This enables automatic alignment (or cueing) of the first frame of film with the projection aperture when the film is brought into engagement with the aperture plate by equalizing the distance between the mark on the leading end portion of film and the first frame thereof to the film path between the mark sensor 172a and the projection aperture.

Still another important advantage of the motion picture projector is that upon completion of film projection the filmstrip supported between the supply of film occupying the projecting position and the take-up reel occupying the first position is shifted transversely to the direction of movement of film to adjacent film rewinding path which is cleared of the various components of the projector. This allows a subsequent supply of film to assume the projecting position at the instant the film projection is completed without time lag for the rewinding operation of a preceding film.

In the illustrated embodiments, the film handling time is reduced to within the minimum projection time of 5 seconds, so that uninterrupted film projection is possible by the provision of two projectors arranged to initiate film projection in one projector subsequent to the completion of projection by the other.

What is claimed is:

1. A motion picture projector comprising, in combination, a housing having a film projection aperture and supporting an intermittently movable shuttle tooth adjacent said aperture for advancing film past the aperture;

means for supporting a series of supplies of convoluted motion picture film;

first shifting means for moving said supplies stepwise so as to place successive ones of the supplies of film into a projection position and therafter into a rewinding position;

first and second take-up reels rotatably mounted on said housing and axially movable between a first position opposite to said projecting position and a second position opposite to said rewinding position;

second shifting means of simultaneously shifting said first and second take-up reels between said first and second positions while said supplies are shifted between said projecting and rewinding positions in coaction with said first shifting means;

means for driving the supply in the projecting position to advance the leading end portion of film;

a grooved guide movable between an active position in which said guide defines a straight film threading path between the supply occupying said projecting position and the take-up reel occupying said first position to advance said leading end portion of film therethrough and a normally inactive position in which said guide is clear of said threading path;

guide shifting means for moving said grooved guide to said active position when a supply is shifted to said projecting position and for returning the same to said normal position;

rewinding means for simulataneously rewinding the film from the takeup reel occupying said second position on the supply occupying said rewinding position while said supply in said projecting position is driven by said drive means;

a sensor for sensing the presence of the leading end portion of said film passing through said film threading path to produce a threading completion signal;

first and second capstans mounted for rotation and disposed along said film threading path on opposite sides of said projection aperture;

first and second rollers spaced opposite said first and second capstans respectively, and movable transversely to said straight film threading path between an active position in which said first and second rollers are in frictional contact with circumferential peripheries of said first and a second capstan respectively, and a normally inactive position disengaged from contact with said first and second capstans to clear said threading path;

film guide and engagement means disposed between said first and second rollers opposite said projection aperture and movable between an active position in which said film guide and engagement means urges said film into engagement with said intermittently movable shuttle tooth with a frame of said film in registry with said projection aperture, and normally inactive position in which said film is disengaged from said shuttle tooth;

roller control and capstan drive means responsive to said threading completion signal for moving said first and second rollers to said active position and for driving said first and second capstans to rotate in a direction effective to feed said film to the take-up reel occupying said first position; and third shifting means for moving said film guide and engagement means to said active position in coaction with said roller control and capstan drive means to maintain the film engaged with said intermittently movable shuttle tooth as it is fed to the take-up reel occupying said first position to maintain frames of said film in registry with said projection aperture during feeding of the film.

2. A motion picture projector as claimed in claim 1, wherein said first capstan is driven at a peripheral speed higher than the speed at which said film is moved by said shuttle tooth so as to form an upper free loop between said first capstan and said film guide and engagement means, and wherein said projector further comprises a second sensor adjacent said upper free loop for detecting the enlargement of said free loop and a servo control means responsive to detection of the enlargement of said upper loop to control the peripheral speed of said first capstan.

3. A motion picture projector as claimed in claim 1, wherein said second capstan is provided with a flywheel and is driven at a constant peripheral speed to thereby form a lower loop due to the inertia of said second capstan between said second capstan and said film guide and engagement means, and wherein said projector further comprises a third sensor adjacent said lower free loop for detecting the taut condition of film in said lower free loop and a pivoted shuttle arm responsive to detection of said taut condition for enlarging said lower free loop.

4. A motion picture projector as claimed in claim 1, comprising means for driving the take-up reel occupying said first position at a first peripheral speed higher than the peripheral speed of the outermost of said convoluted film in the supply occupying said projecting position prior to threading of film and at a second peripheral speed equal to said peripheral speed of the outermost of said convoluted film when said film is taken up by said take-up reel.

5. A motion picture projector as claimed in claim 1, wherein the take-up reel occupying said first position is arranged to be driven to take up slack in a contoured film path produced when film handling components including said first and second rollers and said film guide and engagement means are retracted to their inactive positions.

6. A motion picture projector as claimed in claim 1, wherein the minimum width of said straight film threading path at least slightly exceeds the maximum width of the leading end portion of said convoluted film.

7. A motion picture projector as claimed in claim 1, wherein said first and second rollers are located between the supply occupying said projecting position and the take-up reel occupying said first position with the first roller being adjacent said supply and said second roller being adjacent said take-up reel, and said first sensor is located between said second roller and said take-up reel.

8. A motion picture projector as claimed in claim 1, wherein said take-up reels are rotatable in respective housings each being fixed to their axles and movable therewith between said first and second positions, said housing including two opposing side walls having two opposed slots to define a film entry and angular path having a width at least slightly exceeding the maximum width of the leading end portion of said film.

9. A motion picture projector as claimed in claim 8, wherein said second shifting means comprises a first and a second support, a first and a second tubular member axially slidably supported in said first and second supports and coupled at one end to said respective housing, means for axially moving said tubular members in opposite directions to move said housings between said first and second positions, and a first and a second drive shaft rotatably received in said first and second tubular members respectively and axially movably therewith and coupled at one end to each of said take-up reels and provided at the other end a clutch means engageable with a drive means and further provided with radially extending springbiased prongs engageable in frictional contact with one end of each of said first and second supports when said housing is in said rewinding position.

10. A motion picture projector as claimed in claim 1, wherein said first shifting means comprises a box-like pusher slidably movable on a guide rail between a first and a second positions with a film inlet passage therebetween, and means for moving said pusher in opposite directions into and out of said first and second positions to thereby place a convoluted film in said inlet passage in said projecting position.

11. A motion picture projector as claimed in claim 10, wherein said first shifting means includes a rotary shaft pivoted about an axis parallel with said guide rail and having at one end meshing teeth engageable with teeth at one end of the drive axle of said supply, and means for axially moving said rotary shaft so as to engage said teeth with said teeth at one end of the drive axle of said supply and for driving said rotary shaft about its axis while said pusher is moved along said guide rail, whereby slack in the film convoluted on said supply is removed.

12. A motion picture projector as claimed in claim 1, further comprising a sensor positioned in the film rewinding path between the supply occupying said rewinding position and the take-up reel occupying said second position for sensing the presence of said leading end portion of film.

13. A motion picture projector as claimed in claim 12, further comprising film ejecting means responsive to sensing the presence of said leading end portion of film by said sensor for ejecting the supply occupying said rewinding position in a direction normal to the axle of said convoluted film.

14. A motion picture projecting system comprising: means for supporting a series of supplies of convoluted motion picture film; and a first and a second motion picture projector each having a film aperture and an intermittently movable shuttle tooth adjacent said aperture, each of said first and second projectors comprising:

first shifting means for moving said supplies stepwise so as to place successive supplies of film into a projecting position and thereupon into a rewinding position; first and second take-up reels rotatable about and movable along the respective axes thereof between first and second positions; second shifting means for oppositely moving said first and second take-up reels between said first and second positions in coaction with said first shifting means; grooved guide means movable between an active position in which said guide means defines a straight film threading path between the supply occupying said projecting position and the take-up reel occupying said first position and a normally inactive position in which said guide mean is cleared of said threading path; guide shifting means for moving said grooved guide means to said active position; first means for sensing the presence of the leading end portion of said film passing through said film threading path to produce a threading completion signal; first and second rollers spaced apart from each other and movable transversely to said straight threading path between an active position in which said first and second rollers are in frictional contact with the circumferential peripheries of a first and second capstans respectively and a normally inactive position disengaged from contact with said first and second capstans to be cleared of said threading path; film guide and engagement means disposed between said first and second rollers and movable between an active position in which said film guide and engagement means engages said film with said intermittently movable shuttle tooth with a frame in said film in registry with said projection aperture and a normally inactive position in which said film is disengaged from said shuttle tooth; roller shifting means responsive to said threading completion signal for moving said first and second rollers to said active position; capstan drive means for driving said first and second capstans in a rotational direction effective to feed said film to the take-up reel occupying said first position; and third shifting means for moving said film guide and engagement means to said active position in coaction with said roller control and drive means; second means for sensing the end of film projection to produce an end-of-projection signal; and means for rewinding the film from the take-up reel occupying said second position onto the supply occupying said rewinding position; and means for alternately loading said supplies into said projecting positions of said first and second projectors;

said capstan drive means being responsive to the end-of-projection signal derived from the other of said projectors for driving said first and second capstans to initiate film projection.

15. A motion picture projecting system as claimed in claim 14, wherein said loading means comprises a boxlike pusher slidably movable on a guideway between said first projector and said second projector with a film inlet passage therebetween, and means for moving said pusher sideways in opposite directions to thereby alternately place a supply of film in said inlet passage in the projecting position of said first and second projectors.

* * * * *